United States Patent [19]

Gibson et al.

[11] Patent Number: 5,143,522
[45] Date of Patent: Sep. 1, 1992

[54] ABRASIVE PRODUCTS CONTAINING FUSED ALUMINA ZIRCONIA AND REDUCED TITANIA

[75] Inventors: Brian Gibson, Gatley, England; Robert J. Seider, Ransomville, N.Y.

[73] Assignee: Washington Mills Electro Minerals Corporation, Niagara Falls, N.Y.

[21] Appl. No.: 277,618

[22] Filed: Nov. 29, 1988

Related U.S. Application Data

[63] Continuation-in-part of Ser. No. 917,235, Oct. 7, 1986, which is a continuation of Ser. No. 676,594, Nov. 30, 1984, which is a continuation of Ser. No. 477,065, Mar. 21, 1983, which is a continuation of Ser. No. 205,062, Nov. 7, 1980, abandoned.

[30] Foreign Application Priority Data

Nov. 9, 1979 [GB] United Kingdom ............. 7938957

[51] Int. Cl.$^5$ ............................................. B24D 3/00
[52] U.S. Cl. ........................................ 51/295; 51/298; 51/309; 264/5; 264/8; 264/9
[58] Field of Search ................ 51/309, 917, 235, 298, 51/295; 264/5, 8, 9

[56] References Cited

U.S. PATENT DOCUMENTS

| | | | |
|---|---|---|---|
| Re. 31,128 | 1/1983 | Walker et al. | 51/309 |
| Re. 31,725 | 11/1984 | Walker et al. | 51/309 |
| 1,240,490 | 9/1917 | Saunders et al. | |
| 1,240,491 | 9/1917 | Saunders et al. | |
| 2,653,107 | 9/1953 | Blumenthal | 106/57 |
| 2,877,104 | 3/1959 | Robie | 51/308 |
| 3,156,545 | 11/1964 | Kistler et al. | 51/298 |
| 3,175,894 | 3/1965 | Foot | 51/298 |
| 3,181,939 | 5/1965 | Marshall et al. | 51/309 |
| 3,454,385 | 7/1964 | Amero | 51/298 |
| 3,726,621 | 4/1973 | Cichy | 425/6 |
| 3,861,849 | 1/1975 | Richmond et al. | 425/447 |
| 3,891,408 | 6/1975 | Rowse et al. | 51/295 |
| 3,893,826 | 7/1975 | Quinan et al. | 51/295 |
| 3,928,515 | 12/1975 | Richmond et al. | 264/5 |
| 3,977,132 | 8/1976 | Sekigawa | 51/309 |
| 4,059,417 | 11/1977 | Ilmaier et al. | 51/309 |
| 4,061,699 | 12/1977 | Cichy | 264/5 |
| 4,070,796 | 1/1978 | Scott | 51/309 R |
| 4,111,668 | 9/1978 | Walker et al. | 51/309 |
| 4,142,871 | 3/1979 | Zeiringer | 51/308 |
| 4,157,898 | 6/1979 | Walker et al. | 51/309 |
| 4,366,254 | 5/1981 | Rich et al. | 501/89 |
| 4,415,510 | 11/1983 | Richmond | 264/8 |
| 4,439,895 | 4/1984 | Richmond | 23/305 |

FOREIGN PATENT DOCUMENTS

| | | |
|---|---|---|
| 888762 | 12/1971 | Canada . |
| 924112 | 4/1973 | Canada . |
| 2900007 | 7/1979 | Fed. Rep. of Germany . |
| 35594 | 10/1973 | Japan . |
| 62111 | 5/1979 | Japan . |
| 99781 | 8/1979 | Japan . |
| 1409112 | 6/1972 | United Kingdom . |
| 1381814 | 1/1975 | United Kingdom . |
| 1392618 | 4/1975 | United Kingdom . |
| 1421174 | 1/1976 | United Kingdom . |

*Primary Examiner*—James Derrington
*Attorney, Agent, or Firm*—Howard M. Ellis; Michael L. Dunn

[57] ABSTRACT

An abrasive grain comprising about 20 to about 50% by weight of zirconia; reduced titania in an amount on analysis expressed as titanium dioxide of 1.5 to about 10% by weight; total carbon in an amount of 0.03 to about 0.5% by weight; impurities, if any, in a total amount on analysis expressed as the oxides of not greater than 3% by weight; and a balance of alumina. The microstructure of the abrasive grain comprises primary alumina or zirconia crystals embedded in a supporting alumina-zirconia eutectic matrix. The grain may be produced by combining and melting the alumina and zirconia; adding titania and carbon (excess carbon being required); melting and reducing the titania under reducing furnace conditions; and solidifying the melt in under three minutes by means of a suitable heat sink material. The abrasive grain has a high proportion of tetragonal zirconia and may be used to produce coated abrasive products or bonded abrasive products.

37 Claims, 1 Drawing Sheet

ABRASIVE PRODUCTS CONTAINING FUSED ALUMINA ZIRCONIA AND REDUCED TITANIA

CROSS-REFERENCES TO RELATED APPLICATIONS

This is a continuation-in-part of copending application Ser. No. 917,235, filed Oct. 7, 1986, which is a continuation of application Ser. No. 676,594, filed Nov. 30, 1984, which is a continuation of application Ser. No. 477,065, filed Mar. 21, 1983, which is a continuation of application Ser. No. 205,062, filed Nov. 7, 1980, now abandoned.

BACKGROUND OF THE INVENTION

This invention relates to an abrasive grain, a method of producing such grain, and abrasive products incorporating such grain. More particularly, it relates to abrasive products containing fused alumina, zirconia and reduced titania.

Abrasives based on substantially pure alumina or alumina modified with 0.25% to 6% additions of minor impurity phases, or residual impurity phases derived from the original starting materials, have proved to be the most versatile and commercially important abrasive systems. They find application in the most diverse types of grinding operation involving the more common types of metal.

Although the levels of impurity are quite low their influence on the abrasives' grinding performance can be most dramatic and significant. By changing the impurities, cooling and solidification rate of the fused mass of material, a range of "alumina abrasives" has been developed over the years. The individual types have unique combinations of properties, e.g. hardness, toughness, frictional characteristics, microstructure, fracture properties, thermal behavior, etc., which have made each type ideally suited to a specific area or field of grinding applications using coated and bonded abrasive products containing them.

Until recently no commercially competitive material has been available which offered grinding properties superior to those of substantially pure aluminas, particularly in applications where the contact pressures were low to moderate.

Attempts have been made to alloy alumina with other oxides at much higher levels than had previously been used. The material showing distinct promise of success was zirconia.

Such attempts met with some success when at least 10% by weight of zirconia was fused with aluminum oxide and when the fused zirconia-alumina mixture was rapidly solidified.

U.S. Pat. No. 3,156,545, issued Nov. 10, 1964, to Kistler et al. discloses that an abrasive having a grinding removal rate comparable to the removal rate of alumina can be prepared by rapidly cooling a composition containing about 15% to 60% by volume of glass, such as silicon dioxide, to form a glassy matrix in which particles of zirconia and alumina are embedded. The resulting abrasive, however, was not substantially superior to alumina in steel removal rate.

Other alumina-zirconia alloys have, however, been disclosed in subsequent U.S. and British Patents wherein high purity alumina and zirconia are used. The products disclosed in these patents do show substantial improvements in performance, in specific areas, over alumina.

For example, U.S. Pat. No. 3,181,939, issued May 4, 1965, to Marshall et al., discloses that high strength abrasives can be obtained when from 10 to about 60% by weight of zirconia is fused with alpha alumina and the resulting fusion is rapidly cooled. The patent discloses that such abrasives are suitable for steel snagging operations, (i.e. high pressure operations) where high strength is required. The patent, however, indicates that the alpha alumina should be of high purity, usually at least 99.8% by weight aluminium oxide, and further indicates that the purity of the zirconia should be preferably at least 99%.

As disclosed in U.S. Pat. No. 3,891,408, issued Jun. 24, 1975, to Rowse et al. and U.S. Pat. No. 3,893,826, issued Jul. 6, 1975, to Quinan et al., the best grinding and polishing abrasive characteristics are obtained when the proportions of zirconia to alumina are such that a eutectic structure is formed when the fused alumina-zirconia mixture is rapidly cooled.

U.S. Pat. No. 3,891,408 to Rowse et al. teaches the very rapid crystallization of eutectic and near eutectic molten mixes of aluminium oxide and zirconium oxide. Rowse et al. believe the optimum eutectic composition and performance in moderate pressure applications occurs at 43% by weight of zirconia, and the amount of zirconia in their abrasive grain is 35-50% by weight. The zirconia in their material is in the form of rods (or platelets) which, on the average, are less than 0.3 microns in diameter, and preferably at least 25% by weight of the zirconia is in the tetragonal crystal form. The solidified melt is made up of cells or colonies, typically 40 microns or less across their width. Groups of cells having identical orientation of microstructure form grains which typically include 2 to 100 or more cells or colonies. In crushing, the material fractures along grain and cell boundaries. The abrasive grits produced are described as having very high strength combined with highly desirable microfracture properties.

The novel and unexpected feature alleged for abrasives produced in accordance with U.S. Pat. No. 3,891,408 was that when produced at or near the eutectic composition they were outstandingly useful in "light duty applications". Abrasive grits produced in accordance with U.S. Pat. No. 3,891,408 gave improvements in excess of 100% of prior art standards when incorporated in coated abrasive products and tested in low or moderate pressure applications. When such grits were incorporated into bonded products substantial improvements were obtained in low to moderate pressure applications.

The properties of the abrasive grains produced in accordance with U.S. Pat. No. 3,891,408 are to be contrasted with the use of lower zirconia levels, e.g. 25% which leads to very tough abrasives which find utility in high pressure operations such as snagging operations.

U.S. patent application Ser. No. 868,154, filed Jan. 9, 1978, by Paul Cichy et al., and now abandoned in favor of U.S. patent application Ser. No. 31,251, filed Apr. 18, 1979, by Paul Cichy et al., and now abandoned, describes an abrasive composition comprising a rapidly solidified, co-fused mixture of from about 25 to about 50 weight percent zirconia, from about 49.2 to about 74.2 weight percent alumina, and from about 0.8 to about 2.5 weight percent silica. The disclosure of application Ser. No. 868,154, filed Jan. 9, 1978, was published in West German Published Patent Application ("Offenlegungsschrift") 2,900,007, on Jul. 12, 1979, based on a West Germany patent application filed Jan. 2, 1979, by Paul Cichy et al.

SUMMARY OF THE INVENTION

It has now been discovered that superior alumina-zirconia abrasives can be produced by incorporating sufficient amounts of reduced titania (titanium dioxide) in the abrasive.

According to a first aspect of the present invention there is provided an abrasive grain comprising from about 20 to about 50%, preferably from about 27 to about 35%, by weight zirconia: reduced titania in an amount on analysis expressed as titanium dioxide of 1.5 to about 10%, preferably from about 2.4 to about 5% by weight: total carbon in an amount from about 0.03 to about 0.5%, preferably from about 0.08 to about 0.25% by weight; impurities, if any, in a total amount on analysis expressed as the oxides of not greater than about 3% by weight; and a balance of alumina.

The abrasive preferably contains zirconia with a tetragonal zirconia content in excess of 25%, more preferably in excess of 40%, and still more preferably in excess of 60% of tetragonal zirconia, by weight of the total zirconia present.

According to a second aspect of the invention there is provided a method of producing an abrasive grain, comprising the steps of:
(a) combining
  (1) from about 50 to about 78.5, preferably from about 60 to about 70.6 parts by weight of alumina, with
  (2) from about 20 to about 50, preferably from about 27 to about 35 parts by weight of zirconia;
(b) melting the combined alumina and zirconia:
(c) adding, to the melted alumina and zirconia,
  (3) from 1.5 to about 10, preferably from about 2.4 to about 5 parts by weight of titania; and
  (4) from about 0.6 to about 5 parts by weight of carbon;
(d) heating the combined ingredients under reducing furnace conditions until the titania is melted; and
(e) casting the melted composition onto a heat sink material in such a manner that solidification of the melt is effected in under three minutes, preferably under one minute, and more preferably under twenty seconds.

The parts by weight of alumina, zirconia and titania correspond to the percentages by weight of alumina, zirconia and reduced titania desired in the final product. The parts by weight of carbon added is in excess of the percentage by weight of carbon desired in the final product, because some of the carbon is consumed in the reaction and leaves the composition as carbon dioxide and carbon monoxide.

The present invention also provides abrasive products, for example coated abrasive products or bonded abrasive products, which incorporate the abrasive grain of the invention.

BRIEF DESCRIPTION OF THE DRAWING

The drawing illustrates the apparatus used to test the abrasives in the Example.

DETAILED DESCRIPTION

Figure 1:
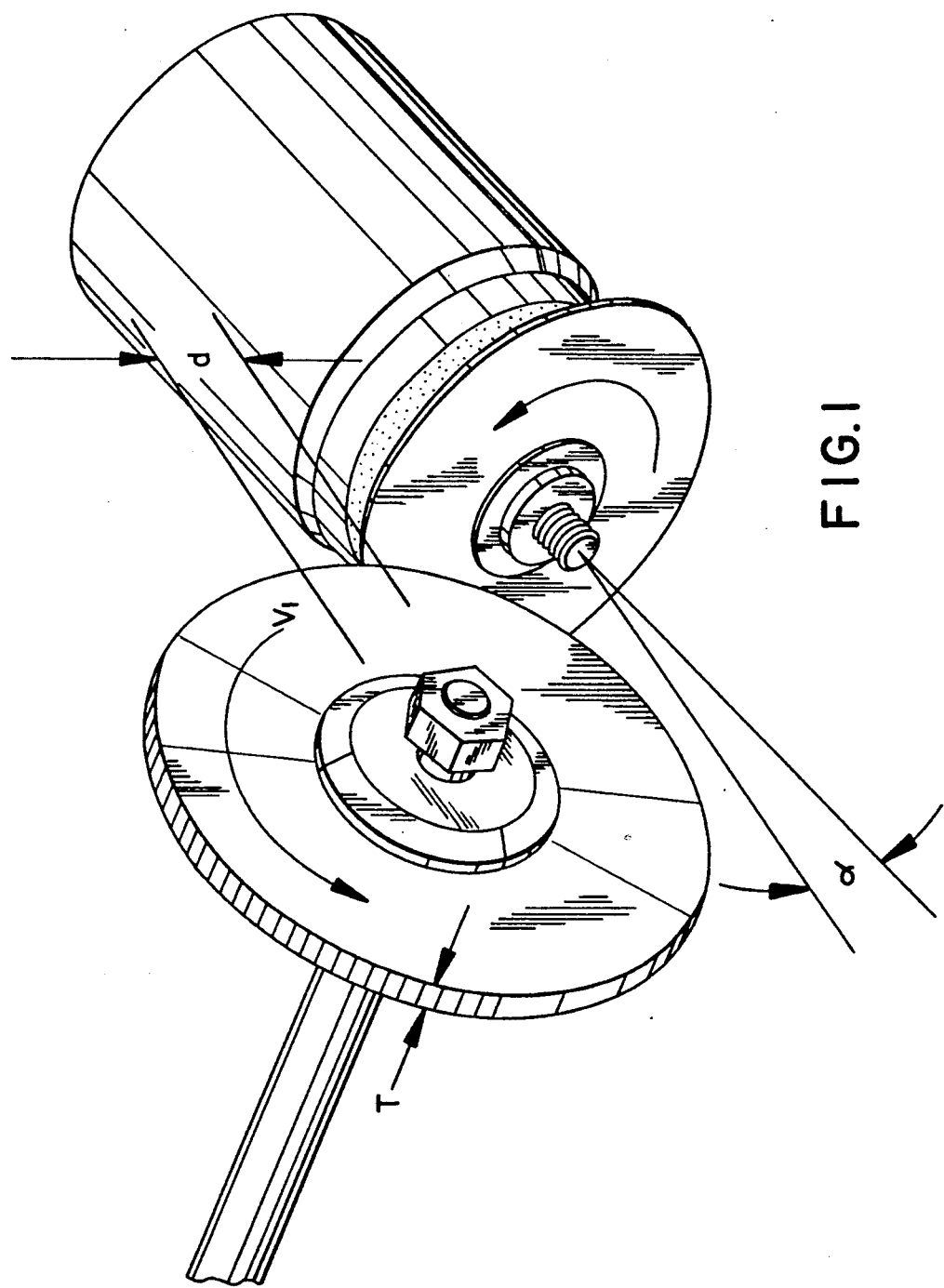

The amounts of a reduced form titania and the amounts of impurities in the abrasive grain of the invention given above are the analyses expressed as the most highly oxidized commonly occurring oxides. This is conventional practice in abrasive technology but does not mean to say that the titanium or impurities, if any, are necessarily present as the most highly oxidized commonly occurring oxides and indeed this may well not be the case (and is not the case with respect to titanium)., as will be seen from the following description. Nevertheless, conventional analytical techniques for abrasive products determine, and express, the amounts of the various components as oxides and this practice is adopted herein. In fact, the general procedure is to determine the amounts of the various components, other than total carbon and soluble titanium, as oxides, and it is on this basis that the analytical figures for abrasive grains are quoted herein.

In the following description it is to be understood that references to the amount of reduced titania or impurities in the abrasive grain are the analytical figures expressed as oxides. "Titania" as used herein, without the modifier "reduced," refers to titanium dioxide. "Reduced titania" refers to titanium carbide and to oxides and oxycarbides of titanium in which the valance of titanium is less than four.

The amount of reduced titania present in the abrasive grain of the invention is from 1.5 to about 10% by weight, preferably from about 2.4 to about 5% by weight, expressed as titanium dioxide, $TiO_2$. Such levels of reduced titania have been found to enhance the low to moderate pressure performance of abrasive grains which include 20 to 50% by weight of zirconia. The mechanism by which the reduced titania provides this improvement of properties is uncertain but may be due to an enhancement of frictional characteristics and rate at which heat is generated when in contact with the metal, which would thermally assist the penetration of the abrasive into the metal. It is also believed that the presence of at least 1.5% reduced titania, expressed as titanium dioxide, increases the proportion of the zirconia which is in the tetragonal crystal structure. A high proportion of zirconia in the tetragonal crystal structure, in a fused alumina-zirconia abrasive grain, is known to increase the grinding performance of the abrasive grain.

It is necessary to include sufficient carbon that the abrasive grain has a carbon content of from 0.03 to about 0.5% carbon, preferably from about 0.08 to about 0.25% carbon, in order that the titania in the product be properly reduced. In general this will require excess carbon, i.e.. at least about 0.6%, preferably about 2.5%, and as much as about 5%, carbon in the mix which is melted. Additionally, it is necessary to furnace the mix to melt the titania under reducing conditions, rather than oxidizing conditions. Addition of excess carbon is not detrimental, but the excess carbon will reduce oxides present and be removed from the mix as carbon monoxide and carbon dioxide. The most critical limits are the presence of sufficient carbon and sufficient titania in the solidified melt (0.03% carbon, and 1.5% reduced titania expressed as titanium dioxide, respectively). The other limits may be exceeded slightly without greatly affecting performance.

The impurities, if any, which are present in the grain are either the residual impurities introduced with the starting materials or additions which have deliberately been made. Such additions may be made for example, to assist refining. e.g. iron and carbon are added to bauxite fusions to reduce and control silica and iron oxide levels. It is in fact common practice to add materials to adjust the final analysis or to combine undesirable phases to facilitate their removal by precipitation to the base of the furnace, or volatilization from the surface of the melt.

Since it is economically not possible to remove all impurities completely, the abrasive grain of the invention may contain certain impurities which can critically effect and can detract from its performance. It is essential that such materials be kept within certain limits. Such materials are alkalis (soda, potash, lithia) alkaline earths, silica and ferric oxide. These may be present individually, in combination with one another, or in combination with the major phases, or exist in reduced forms such as carbides, nitrides or even free metals.

The potency of such detrimental impurities is variable. Alkalis, particularly soda, have a devastatingly detrimental effect on performance. Silica is also detrimental at the zirconia levels used in the present abrasives but is less harmful than alkalis. Alkaline earths are more easily avoided in the final composition but are thought to be similar or less detrimental than silica. It should be noted that at higher zirconia levels, for example at the eutectic zirconia alumina composition, silica may in some cases be viewed as a beneficial ingredient, as described for example in U.S. patent application Ser. No. 31,251, filed Apr. 18, 1979, by Paul Cichy et al., and now abandoned.

Thus in the final composition the level of the other minor impurity phases should be kept to the minimum economic levels. These are dictated by the choice, cost availability and quality of the sources of alumina and zirconia and the extent to which they can be favorably modified economically by the fusion technique employed. Irrespective of the material sources or the fusion technique imposed the final composition should preferably not contain more than 0.1% soda ($Na_2O$) or more than 1% silica ($SiO_2$) The $SiO_2$ content is preferably below 0.5%, more preferably below 0.3%, still more preferably below 0.2%, and ideally below 0.1% by weight. At the upper limits of $Na_2O$ and $SiO_2$ their deleterious effect is not too great and in part can be neutralized by adjusting the titania levels. Additionally the combined weight percentage of MgO, CaO and $Fe_2O_3$ should not exceed 1.5%. Combined alkali and alkaline earths (CaO and MgO). should preferably be below 1.0 weight percent and ideally below 0.5 weight percent, of which soda should comprise less than 0.1 weight percent.

The abrasive grain of the invention may be produced by rapidly solidifying a melt of alumina, zirconia and titania which additionally includes the required carbon, and possibly also impurities, and which on solidification gives an abrasive grain in accordance with the invention. Solidification is effected by contacting the melt with a heat sink material and should take place in under 3 minutes, more preferably in under 1 minute, most desirably in under 20 seconds. The heat sink material, or cooling vehicle, may take the form of metallic balls, metallic rods or plates, or lumps of prefused abrasive material onto which the melt is poured.

One important criterion for the cooling vehicle is that is has a configuration, size and mass that it forms voids or spaces into which, and surfaces onto which, the molten material can gain access. In so doing the cooling vehicle should expose a sufficiently large surface area to the molten mass to effect solidification of the melt in under 3 minutes, preferably under 1 minute and more preferably under 20 seconds after the molten material contacts the surface provided by the cooling vehicle. At the very high rate of heat transfer the cooling vehicle should be capable of absorbing the thermal energy involved without melting or severe deterioration of its properties to enable the cooling vehicle to be used repeatedly. An example of such a cooling vehicle which achieves the above objectives is the rod mold as detailed in U.S. patent application Ser. No. 939,272, filed Sep. 5, 1978, by Brian Gibson, and now abandoned. Another is casting on metal balls as described in U.S. Pat. Nos. 4,415,510 and 4,439,845, issued to Richmond on Nov. 15, 1983 and Apr. 3, 1984, respectively. Other techniques well known in the art may also be used.

A further example of cooling method is, instead of pouring the melt into a cooling vehicle, to introduce a cooling vehicle into the melt and to withdraw the cooling vehicle when a layer of product has solidified thereon.

Once separated from the cooling vehicle, the solidified mass may be subjected to the normal types of crushing procedures to produce abrasive grits. The crushing procedure may comprise primary jaw crushing, secondary roll crushing, canary milling or hammer impact milling. The crushing technique used may be varied to produce grits having different shapes. This is common practice in the industry to extend the use of specific abrasive compositions to as wide an area of abrasive products and applications as possible. For example a more friable weak elongated sharp grit may be required in certain coated abrasive applications whereas a sharp but more "blocky" tougher grain may be required in certain bonded abrasive applications.

The particle size of the abrasive grits produced may be between 6 to 1,000 grit as defined by FEPA standards issued 1971-72 or U.S. Department of Commerce Commercial Standard CS271-65 issued Apr. 12, 1965. The grit size is preferably between 6 and about 180 and most desirably is between about 14 and 80.

The abrasive grain of the invention may be utilized for the production of coated abrasive products and bonded abrasive products in conventional manner. The inventive abrasive grain may be the sole abrasive in such products, or may be used in conjunction with conventional abrasives.

A more detailed description of the method of producing the abrasive grain will now be given by way of example only.

The alumina for the intended composition may be introduced in the form of bauxite or calcined alumina obtained from the Bayer process or surplus abrasive grits containing a substantial quantity of alumina. Bauxite used in the abrasive industry in addition to alumina usually contains from about 3 to about 4.5 weight percent titania, from about 3 to about 8 weight percent silica, and from about 3 to about 10 weight percent iron oxide ($Fe_2O_3$).

The bauxite may be synthetic bauxite, unpurified calcined bauxite or only partially purified bauxite, i.e. alumina made by the fusion and reduction of calcined bauxite with metallic iron and carbon. When unpurified calcined bauxite is used directly, iron and carbon should be incorporated into the bauxite-zirconia fusion to remove iron oxide and as much silica as possible. Titania may also be reduced to too low a level in this system and further additions of titania may be necessary to adjust the final analysis.

Synthetic bauxite is produced by combining or mixing pure alumina with desirable impurities such as titania which is then used in place of the natural bauxite.

Pure alumina used herein may be surplus abrasive grits high in alumina or calcined alumina obtained from the Bayer process. The latter has two forms which differ in soda content: low soda calcined alumina containing 0.1% or less Na$_2$O by weight and normal calcined alumina containing 0.5–0.3% Na$_2$O by weight.

The zirconia required by the composition may be provided in the form of Baddelyite ore which usually contains from:
about 96.5 to 99 weight percent zirconia
about 0.5 to about 1.5 weight percent silica
about 0.3 to about 1 weight percent titania
about 0.1 to about 1 weight percent iron oxide.

Any hafnia present is inclusive in the weight percent figure quoted for zirconia.

When compared with bauxite, the Baddelyite ore is found to contain lower percentages of silica, titania and iron oxide than unpurified bauxite.

The zirconia may alternatively be provided by zirconia bubbles or grain made by smelting zircon ore or purified zirconia.

The titanium required by the composition which is not provided by the residues obtained from the other starting materials is supplied typically by commercially available grades of rutile which contain at least 90% titania and preferably in excess of 95% titania.

Melting of the alumina, zirconia and titania is normally carried out in a carbon arc furnace at a temperature normally in excess of 1,800° C.

The requisite proportions of the alumina and zirconia are usually preblended. The titania and carbon, usually in the form of petroleum coke or graphite, are added after the alumina and zirconia are melted. An additional period of heating is required to melt and reduce the titania, typically about 20 or 30 minutes. During the additional period of heating, reducing furnace conditions should be used (i.e.. electrodes imersed in the bath, low applied voltage and high current passed from the carbon electrodes to the furnace melt). During the initial period of heating, in which the alumina and zirconia are melted, the furnace conditions may be (and usually are) oxidizing.

When the titania is melted (fused) and reduced, the fused mixture is cast or poured into a suitable cooling vehicle wherein rapid cooling and solidification of the melt takes place preferably within 1 minute, more preferably within 20 seconds of the molten material contacting the cooling surfaces provided by the cooling vehicle.

It is believed that any cooling method or vehicle may be used wherein the melted composition is cast or poured upon a heat sink having high heat conductivity, i.e. preferably in excess of about 0.05 calories per second per square centimeter per cm per degree centigrade at about 1,200° C. and wherein the maximum distance through the cast or poured material to the nearest heatsink surface is preferably less than about 2 and more preferably less than about 0.5 centimeters.

Heat sink materials, such as lumps of previously solidified composition, which have lower conductivities may be used provided that the thickness of the cast or poured melted composition is substantially smaller, e.g. in the case of lumps of previously solidified material, less than 0.7 and preferably about 0.3 cm.

Suitable heat sink materials not only have high heat conductivity, but have reasonably high melting temperatures. Steel is a preferred heat sink material for these reasons and also because of its low cost and availability.

Another example of commercially feasible heat sink material is cast iron. Examples of further possible good heat sink materials are chromium, nickel, zirconium and their alloys, although they may be too expensive for commercial use.

After solidification, the resulting composition is comminuted to the desired grain size and grit shape. Such comminuting is achieved using combinations of jaw crushing, impact crushing or roll crushing. i.e. standard techniques to the industry.

The proportion of zirconia in the tetragonal crystal form in the resulting abrasive has been usually found to be greater than 50%, frequently between 70 and 80%. Usually, the higher the residual silica level is, the lower will be the amount of the zirconia obtained in the tetragonal crystal form.

Overall the microstructure obtained consists of two parts:
1. a supporting alumina-zirconia eutectic matrix; and
2. primary alumina or zirconia crystals which are embedded in the matrix.

At a zirconia content of 20 weight percent, the composition contains about 53.5% primary alumina crystals and about 45.5% by weight of matrix.

At the eutectic composition of about 43% by weight zirconia there would be little or no primary alumina or zirconia crystals present; theoretically there would be none. At the upper zirconia limit of 50% by weight zirconia, the abrasive will contain about 12% by weight of primary zirconia crystals and 88% by weight of matrix. The microstructure of the invention must also additionally contain from about 1.5 to 10 weight percent of reduced titania, expressed as titanium dioxide.

The primary alumina or zirconia crystals in the current invention vary in size from about 5 to 50 microns and are predominantly finer than 30 microns. Often they exhibit a dendritic type of orientated structure in which separation both between the dentrites and groups of dendrites occurs by virtue of the present of the eutectic matrix.

The zirconia in the matrix exists as rods or platelets interspersed in an alumina or zirconia rich background phase. The diameter of the rods or thickness of the platelets is thought to be 0.2–0.4 microns. Typically the inter rod spacing averages less than 0.3 microns with appreciably finer spacings existing which often cannot be clearly resolved by the scanning electron microscope.

The matrix consists of groups of rods or platelets of zirconia having a high degree of orientation which divide the matrix between the primary alumina crystals into a series of eutectic colonies or domains. The size of the colonies or domains typically varies between 5 and 30 microns.

The important or vital reduced titania is thought to exist in solid solution within the alumina-zirconia matrix and the primary alumina crystals, either as interstitial additions of titanium atoms of valence 2 or 3 or as substitutions of low-valance titanium atoms for aluminum atoms. The solubility of TiO$_2$ in alumina is only about 0.2%, but reduced titania is soluble to an extent of about 1.8% in alumina. Some additional amounts of reduced titania (in excess of that which is dissolved) are believed to be uniformly distributed in the product as discrete precipitates. It is also considered that some reduced titania exists at the interface between the primary alumina or zirconia crystals and eutectic matrix and particularly at the interface between the eutectic colonies or domains comprising the eutectic matrix in which the primary alumina or zirconia crystals are embedded. The other residual impurities are also thought to be located at these latter sites where they exist individually or in combination with each other or the major phases present including the titania.

The invention will be further described by way of example only with reference to the following Examples.

EXAMPLE 1

A first series of abrasive compositions was produced, according to the methods described above. It was the intention to produce 16 compositions having the zirconia contents and titanium compound contents (added as $TiO_2$), and with the amounts of added carbon, indicated as the "Targeted Composition" in Table 1. Samples 3–6 and 8–16 are examples of the invention, and are hereafter designated "3$i$", "4$i$", etc. Samples 1 and 2 did not contain reduced titania. Sample 7 did not contain a sufficient amount of reduced titania. Samples 3$i$–6$i$, 8$i$–11$i$, 13$i$ and 14$i$ represent preferred compositions within the broad range of the invention.

Three groups of compositions were made. Sample 4$i$ being a member of each of the three groups of compositions. Samples 1, 2 and 3$i$–6$i$ nominally contained 31% zirconia. 2.5% titanium compounds, and varying carbon content. Samples 4$i$, 7 and 8$i$–11$i$ had a nominal zirconia content of 31% and varying contents of titanium compounds and carbon, but with the ratio of carbon to titanium roughly the same. Samples 4$i$ and 12$i$–16$i$ nominally contained 2.5% titanium compounds and 1.2% added carbon, and varying zirconia content. In all 16 samples, the material not specified (excluding minor impurities) was alumina ($Al_2O_3$). The abrasive of Sample 1 varied from the others in that for Sample 1, an oxidizing furnace condition was used for melting the titania: and for Samples 2, 3$i$–6$i$, 7 and 8$i$–16$i$, reducing furnace conditions were used for melting the titania.

The zirconia used as an additive contained about 98% $ZrO_2$, 1.5% $HfO_2$, and 0.5% other impurities. Because hafnia naturally occurs as an impurity in zirconia, and is hard to remove or to distinguish from zirconia chemically, the results reported for wet chemistry analyses for zirconia include hafnia. The x-ray fluorescence analyses for zirconia do not include hafnia.

The molten abrasives were quickly cooled by casting on ¾ inch steel balls, as described in Richmond U.S. Pat. Nos. 4,415,510 and 4,439,895.

After the compositions were made, they were crushed, graded and analyzed for zirconia content, total carbon content, total titanium compound content, and soluble titanium content. The amounts of zirconia and total titanium compounds were determined by X-ray fluorescence, and the amounts of soluble titanium by etching with a mixture of sulfuric and nitric acids. The amounts of insoluble titanium compounds present were then calculated.

The targeted compositions and results of the analyses and calculations are set forth in Table 1.

TABLE 1
Targeted, Analyzed and Calculated Compositions of First Series of Abrasive Samples.

| Sample Number | Targeted Composition | | | Analyzed and Calculated Composition | | | | |
|---|---|---|---|---|---|---|---|---|
| | $ZrO_2$ | Added $TiO_2$ | Added Carbon | $ZrO_2$ | Total Carbon | Total Titanium Compounds (as $TiO_2$) | Soluble Titanium (as Ti) | Insoluble Titanium Compounds (as $TiO_2$) |
| 1 | 31.0 | 2.5 | 0.0# | 30.3 | 0.02 | 2.57 | 0.16 | 2.33 |
| 2 | 31.0 | 2.5 | 0.0 | 30.6 | 0.02 | 2.40 | 0.08 | 2.27 |
| 3i | 31.0 | 2.5 | 0.6 | 30.6 | 0.03 | 2.94 | 0.18 | 2.68 |
| 4i* | 31.0 | 2.5 | 1.2 | 30.1 | 0.05 | 2.92 | 0.24 | 2.50 |
| 5i | 31.0 | 2.5 | 2.5 | 30.5 | 0.13 | 2.63 | 0.37 | 1.98 |
| 6i | 31.0 | 2.5 | 5.0 | 31.3 | 0.28 | 2.56 | 0.40 | 1.83 |
| 7 | 31.0 | 0.7 | 0.23 | 30.7 | 0.01 | 1.10 | 0.07 | 0.98 |
| 8i | 31.0 | 1.5 | 0.69 | 31.0 | 0.03 | 1.74 | 0.13 | 1.52 |
| 4i* | 31.0 | 2.5 | 1.2 | 30.1 | 0.05 | 2.92 | 0.24 | 2.50 |
| 9i | 31.0 | 4.5 | 2.1 | 29.7 | 0.13 | 4.23 | 0.46 | 3.48 |
| 10i | 31.0 | 6.5 | 2.8 | 29.6 | 0.11 | 5.51 | 0.55 | 4.58 |
| 11i | 31.0 | 10.0 | 4.6 | 30.5 | 0.36 | 7.69 | 1.01 | 6.06 |
| 12i | 24.0 | 2.5 | 1.2 | 25.4 | 0.06 | 2.69 | 0.22 | 2.33 |
| 13i | 28.0 | 2.5 | 1.2 | 27.7 | 0.05 | 2.64 | 0.19 | 2.28 |
| 4i* | 31.0 | 2.5 | 1.2 | 30.1 | 0.05 | 2.92 | 0.24 | 2.50 |
| 14i | 34.0 | 2.5 | 1.2 | 32.2 | 0.07 | 2.72 | 0.19 | 2.40 |
| 15i | 38.0 | 2.5 | 1.2 | 35.1 | 0.08 | 2.64 | 0.15 | 2.35 |
| 16i | 44.0 | 2.5 | 1.2 | 38.9 | 0.11 | 2.70 | 0.17 | 2.42 |

Oxidizing furnace condition for melting titania (for others, the furnace conditions for melting titania were reducing).
*Composition 4 listed in each group for convenience of comparison.

The results of the analysis for zirconia content for Samples 14$i$–16$i$ by x-ray fluorescence, given above in Table 1, were doubted because of their deviation from the targeted compositions and the proportions of the materials used to make them; because the x-ray fluorescence calibration assumed that the zirconia content would be about 31%, and because the x-ray fluorescence is known to be slightly inaccurate when measuring samples containing elements significantly different from the calibration assumption, possibly in part because of interference from the sample matrix during irradiation. The zirconia analysis for Samples 14$i$–16$i$ was therefore repeated by wet chemistry. The results were 33.1, 37.4 and 42.7% zirconia, respectively.

The 16 compositions were additionally characterized by determining the silica content, friability, Knoop 200 hardness and percentage of the zirconia in grain ground to 120 grit size which is tetragonal; and in some cases, the percentage of the zirconia in grain ground to 325 to 500 grit size which is tetragonal. (It was found that grinding the grain additionally from 120 grit to 325–500 grit size converts tetragonal zirconia grain to the monoclinic crystal form.) The results of this additional characterization are set forth in Table 2.

TABLE 2

Percentage of Tetragonal Zirconia,
Friability and Hardness Data

| Sample | Silica Content | Percent Tetragonal: 120 grit | Percent Tetragonal: 325-500 grit | Friability | Hardness |
|---|---|---|---|---|---|
| 1 | 0.17% | 2.6 | — | 33.2 | 1577 |
| 2 | 0.19 | 14.7 | — | 33.7 | 1505 |
| 3i | 0.12 | 62.5 | 56.2 | 31.6 | 1686 |
| 4i* | 0.08 | 66.7 | 60.5 | 32.0 | 1627 |
| 5i | 0.07 | 72.2 | 63.0 | 29.9 | 1684 |
| 6i | 0.03 | 71.4 | 58.5 | 30.9 | 1806 |
| 7 | 0.15 | 18.2 | — | 34.9 | 1709 |
| 8i | 0.10 | 40.0 | — | 31.0 | 1827 |
| 4i* | 0.08 | 66.7 | 60.5 | 32.0 | 1627 |
| 9i | 0.15 | 74.7 | — | 34.1 | 1770 |
| 10i | 0.06 | 74.9 | 60.8 | 36.7 | 1793 |
| 11i | 0.06 | 66.9 | 25.7 | 38.1 | 1806 |
| 12i | 0.07 | 71.9 | 58.9 | 33.6 | 1914 |
| 13i | 0.28 | 72.2 | 60.4 | 31.7 | 1744 |
| 4i* | 0.08 | 66.7 | 60.5 | 32.0 | 1627 |
| 14i | 0.28 | 66.7 | 57.6 | 32.8 | 1847 |
| 15i | 0.30 | 63.7 | 51.0 | 33.0 | 1779 |
| 16i | 0.12 | 59.4 | 51.6 | 31.2 | 1772 |

*Composition 4 listed in each group for convenience of comparison.

Abrasives of each of the 16 compositions were then made up into coated abrasive discs and belts. The abrasives for all of the discs were 1:4 by weight mixtures of 25 to 30 and 30 to 35 mesh screen cuts. The discs were made using conventional coated abrasive making procedures, conventional 0.76 mm vulcanized fiber backing and conventional calcium carbonate-filled phenolic resin make coat. The make coat was precured for 75 minutes at 88° C. The size coat contained either calcium carbonate or cryolite, and was precured for 90 minutes at 88° C., followed by a final cure at 88° C. for 10 hours. Some discs were supersized with a KBF4-filled epoxy resin and cured at 88° C. for an additional 10 hours. The coating weights were 45 grains wet make resin, 188 grains of abrasive and 116 grains of wet size resin per 4×6 square inches (equivalent to about 190, 790 and 480 grams per square meter, respectively). After final curing (and supersize curing, if done), 7 inch diameter discs were cut. Comparative discs containing brown heat-treated, titanium-containing fused aluminum oxide ("Alumina A") grain, commercially available "Nor-Zon" fused alumina-zirconia "NZX" grain and blue alumina grain ("Lonza Blue" roasted alumina) were also made for comparative testing. In the first test, comparative discs were also made with "ST" abrasives containing no zirconia, but containing reduced titania as described in U.S. Pat. No. 4,111,668. Grain "ST1" was made with one part titanium and 0.45 parts carbon per 99 parts alumina. Grain "ST2" was made with 2.5 parts titanium and 1.13 parts carbon per 97.5 parts alumina. Grain "ST3" was made with 5 parts titanium and 2.25 parts carbon per 95 parts alumina. The three ST grains thus contained about 1%, 2.5% and 5% reduced titania, respectively. Grains ST1 and ST3 were roasted for ten minutes at 1,300° C. before inclusion in the discs; grain ST2 was not roasted.

The NorZon "NZX" grain used in the various tests was identified as Lot 59427. It was analyzed by x-ray fluorescence as containing 37.75 percent $ZrO_2$, 0.34 percent total carbon. 0.27 percent $Fe_2O_3$, 0.27 percent $SiO_2$, 0.21 percent $TiO_2$, 0.08 percent CaO, 0.05 percent MgO, 0.06 percent $Na_2O$, 0.02 percent KO, and less than 0.01 percent each of MnO and $Cr_2O_3$. Wet chemistry analysis of $ZrO_2$ gave 41.04% for Lot 59427.

Discs were tested on a Swing Arm Disc Tester using "Test Method 1" as described below. Except as noted below, the tested discs contained no supersize. The belts were ground on 304 stainless steel and 1010 mild steel.

The Swing Arm Disc Tester used in "Test Method 1" is illustrated in FIG. 1. The thickness of the workpiece ("T" in FIG. 1) was 0.075 inches (14 gauge). The workpiece diameters were between 8 and 12 13/16 inches, but within 0.25 inches for any one test. The displacement height ("d" in FIG. 1) was 0. The motor angle (alpha in FIG. 1) was 7 degrees. A 6.5 inch hard phenolic backup pad was used behind the discs. The discs were turned at 3,595 RPM when running free. The load was 1,980 grams (2,670 grams dead weight). Each disk was tested for one eight-minute grinding cycle.

The coated abrasive discs for which results are reported in Table 3 were made by coating the abrasives on "YF" polyester backing (having a weight of 270 grams per square meter). using a two-layer abrasive construction. The make resin coat and size resin coats were both phenolic resin filled with calcium carbonate, 48% by weight phenolic resin solids and 52% by weight calcium carbonate (dried weight). The make coat was applied at 98 grains wet make resin (about 410 grams per square meter). and was precured for 75 minutes at 88° C. The first abrasive layer was grade 36 heat-treated titanium-containing fused aluminum oxide ("Alumina A"). which was drop coated at 98 grains per 4×6 square inches (about 410 grams per square meter). The second abrasive layer was grade 36 abrasive having one of compositions 1, 2, 3i-6i, 7 and 8i-16i, which was passed over a beater bar and electrostatically coated at 140 grains per 4×6 square inches (about 580 grams per square meter), and was precured for 90 minutes at 88° C. followed by a final cure at 100° C. for 10 hours. After final curing, the coated abrasives were converted to 3 inch×132 inch endless belts. The belts were tested with 304 stainless steel and 1010 mild steel.

In a first test, discs containing samples 3i, 6i, 8i, 14i and 16i; reduced titania grains "ST1", "ST2" and "ST3" containing about 1%, 2.5% and 5% reduced titania in alumina, as described above; and "Alumina A", blue alumina and commercially available "NorZon" fused alumina-zirconia "NZX" grain (Lot 59427) comparative grains, each also containing calcium carbonate filler, were tested grinding 1010 mild steel and 304 stainless steel, using Test Method 1 as described above. For each of the five samples and three comparative grains tested, three discs were tested for each of the two steels tested. The total amount of steel abraded with the three discs (24 minutes total grinding time) was recorded. The results are set out in Table 3.

TABLE 3

Disc Grinding Test Results.

| Sample | Total Grams 1010 Steel Cut | Total Grams 304 Steel Cut |
|---|---|---|
| 3i | 137 | 40.3 |
| 6i | 158 | 40.7 |
| 8i | 125 | 33.0 |
| 14i | 144 | 40.3 |
| 16i | 161 | 43.0 |
| Reduced Titania Grain | | |
| ST1 | 94 | 29.3 |
| ST2 | 102 | 31.7 |
| ST3 | 97 | 29.0 |
| Comparative Grain | | |

TABLE 3-continued

| | Disc Grinding Test Results. | |
|---|---|---|
| | Total Grams 1010 Steel Cut | Total Grams 304 Steel Cut |
| Alumina A | 79 | 25.3 |
| Blue Alumina | 92 | 26.7 |
| NZX (Lot 59427) | 117 | 35.0 |

In a second test, discs containing samples 1, 2, 3i–6i, 7 and 8i–16, and "Alumina A", blue alumina and commercially available "NorZon" fused alumina-zirconia "NZX" grain (Lot 59427) comparative grains were tested grinding 1010 mild steel and 304 stainless steel, using Test Method 1 as described above. For the second test, cryolite filler was substituted for the calcium carbonate filler int eh size coat of the first test. For each of the 16 samples and three comparative grains tested, three discs were tested for each of the two steels tested. The total amount of steel abraded with the three discs (24 minutes total grinding time) was recorded. The results are set out in Table 4.

TABLE 4

| | Disc Grinding Test Results. | |
|---|---|---|
| | Total Grams 1010 Steel Cut | Total Grams 304 Steel Cut |
| Sample | | |
| 1 | 97 | 24.3 |
| 2 | 121 | 33.5 |
| 3i | 168 | 57.0 |
| 4i* | 174 | 59.5 |
| 5i | 184 | 54.0 |
| 6i | 157 | 55.0 |
| 7 | 125 | 35.6 |
| 8i | 159 | 45.6 |
| 4i* | 174 | 59.5 |
| 9i | 203 | 63.0 |
| 10i | 188 | 58.0 |
| 11i | 183 | 56.3 |
| 12i | 160 | 49.7 |
| 13i | 163 | 52.6 |
| 4i* | 174 | 59.5 |
| 14i | 166 | 56.0 |
| 15i | 171 | 61.7 |
| 16i | 177 | 63.3 |
| Comparative Grain | | |
| Alumina A | 115 | 37.0 |
| Blue Alumina | 112 | 33.0 |
| NZX (Lot 59427) | 130 | 52.0 |

*Composition 4 listed in each group for convenience of comparison.

A conclusion drawn from an analysis of the data is that abrasive grain as claimed in the present application, namely an abrasive grain comprising 20 to 50 percent, preferably 27 to 35 percent by weight zirconia; reduced titania in an amount on analysis expressed as titanium dioxide of 1.5 to 10 percent by weight; total carbon in an amount of 0.03 to 0.5 percent by weight; impurities, if any, in a total amount on analysis expressed as the oxides of not greater than 3 percent by weight; and a balance of alumina (e.g., Samples 3i–11i and 13i–14i), is a substantially superior grain in terms of performance, as compared to either grain containing only alumina and reduced titanium dioxide (Samples ST1, ST2 and ST3) or alumina and zirconia (NorZon NZX). In particular, the data in Table 4 indicates that the grain of the invention performs up to 20% better on stainless steel and up to 56% better on mild steel, than NorZon "NZX" fused alumina-zirconia grain which is a well-respected premium abrasive grain. (Compare the results for Sample 9i, 203 grams of 1010 mild steel and 63 grams of 304 stainless steel, with the results for NZX grain, 130 and 52 grams, respectively.)

Attention is directed to the first group of samples. Samples 1, 2 and 3i–6i, for which analytical data is presented in Tables 1 and 2 for which grinding performance data is presented in Table 4. Samples 1, 2 and 3i–6i contained nearly the same amounts of zirconia (30.1–31.2%) and nearly the same amounts of reduced titania (2.4–2.9% total titanium compounds). and different amounts of carbon, varying from no added carbon in Samples 1 and 2, to 5% added carbon in Sample 6i. Sample 1 also differs from the remaining samples in that for Sample 1, an oxidizing furnace condition was used for melting the titania; and for Samples 2 and 3i–6i, reducing furnace conditions were used for melting the titania. The added carbon and reducing furnace conditions reduces the titania to oxidation states lower that $TiO_2$. A comparison of the grinding performance of abrasives of Samples 1–2 with those of Samples 3i–6i, as reported in Table 4 therefore shows the importance of the titania being reduced to an oxidation state lower than $TiO_2$.

The first group of samples reported in Table 4 (containing cryolite filler) illustrates that the reduced titania (Samples 3i–6i) performs substantially better than the non-reduced titania (Samples 1–2) on both 1010 mild steel (157–174 grams ground compared to 97–121 grams ground under similar conditions) or 304 stainless steel (54–59.5 grams compared to 24.3–33.5).

The increased performance of the abrasives from Samples 3i–6i cannot be attributed to the presence of reduced titania alone. The discs made from samples reported in Table 3 (containing calcium carbonate filler rather than cryolite and therefore not directly comparable to the data in Table 4) show that the "ST" grains "ST1", "ST2", and "ST3", containing about 1, 2.5 and 5% reduced titania, respectively, but no zirconia, performed better than the two alumina comparative grains, but not as well as the NZX zirconia grain, and not nearly as well as the invention grain (Samples 3i, 6i, 8i, 14i and 16i). A comparison of Sample 3i with ST2 and NZX. all in Table 3, shows that the combination of 2.5% reduced titania and 30.5% zirconia (Sample 3) ground more metal (137 grams 1010 mild steel or 40.3 grams 304 stainless steel) than either 2.5% reduced titania alone (ST2, 102 grams 1010 mild steel or 31.7 grams 304 stainless steel) or zirconia alone (NZX, 117 grams 1010 mild steel or 35.0 grams 304 stainless steel). The increase as compared to blue alumina is sufficient, in the case of 1010 mild steel, to be termed synergistic (Sample 3, 137−92=45 grams increase from blue alumina to both reduced titania and zirconia; ST2, 102−92=10 grams increase from blue alumina to reduced titania alone; NZX, 117−92=25 grams increase from blue alumina to zirconia alone).

The second group of samples reported in Table 4 illustrates the significance of the level of reduced titania. The third group illustrates the significance of the level of zirconia.

In Examples 2–8, the following fusion technique and means of rapid solidification have been used.

Fusions were carried out using a 100 K.V.A. single phase fusion facility. This uses two 3" diameter graphite electrodes adjustable between 4" to 10" spacing and also adjustable with respect to height. Preblended mix of the specific composition to be examined is introduced into the case of the furnace and fusion started by laying a graphite track between the electrodes when spaced 4" apart.

indicated, gave the following percentage chemical analyses listed in Table No. 6.

TABLE NO. 6

| Fusion Number | % ANALYSIS | | | | | | |
|---|---|---|---|---|---|---|---|
| | $ZrO_2$ | $Al_2O_3$ | $TiO_2$ | CaO | $Fe_2O_3$ | $SiO_2$ | $Na_2O$ |
| F357 | 31.5 | 65.96 | 1.82 | 0.04 | 0.15 | 0.5 | 0.03 |
| F358 | 31.2 | 65.07 | 3.35 | 0.01 | 0.05 | 0.3 | 0.02 |
| F359 | 28.6 | 65.22 | 1.82 | 0.01 | 0.01 | 0.3 | 0.04 |
| F360 | 29.0 | 65.15 | 3.26 | 0.04 | 0.01 | 0.5 | 0.04 |
| F361 | 31.9 | 65.55 | 1.67 | 0.01 | 0.04 | 0.8 | 0.03 |
| F362 | 32.0 | 63.73 | 3.28 | 0.04 | 0.01 | 0.9 | 0.04 |
| F363 | 29.1 | 68.40 | 1.73 | 0.02 | 0.02 | 0.7 | 0.03 |
| F364 | 29.0 | 66.77 | 3.26 | 0.03 | 0.02 | 0.9 | 0.02 |

Once the initial pool of molten material had been obtained additional mix was progressively added in increments and the height and spacing of the electrodes adjusted, relative to the melt, to maintain a current of 600 to 1,000 amps at a voltage of 65-90 volts.

Furnacing was continued in this manner for about 30 to 40 minutes after which time the first casting was made. The electrodes were lifted above the surface of the melt and after about 2 minutes delay the molten material was poured into a mold containing 1" diameter steel balls or a rod mold as specified in U.S. patent application Ser. No. 939,272, filed Sep. 5, 1978. by Brian Gibson, and now abandoned having 1" diameter steel rods with a 0.19" inter rod spacing.

The quantity of material produced by each casting was about 20 to 40 lbs, and a number of castings were carried out for each specific composition.

The cast and solidified material produced by the above procedure was comminuted to yield abrasive grits. Typically the material was jaw crushed to yield about 8 grit and finer product which was then secondary roll crushed to yield a 16 grit and finer stock material. After coarse magneting to remove free iron contamination from the crushing equipment, the stock material was accurately sieved into cross matched grit sizes for product manufacture and physical and chemical analysis. This yielded 16 grit to 80 grit: these being the most popular sizes for subsequent grinding tests. Commercially a complete grit size range would be produced.

EXAMPLE 2

A series of such fusions were carried out in the manner described above. The starting material and mix compositions used are listing in Table No. 5.

TABLE NO. 5

| Starting Materials | Low Soda Alumina Compositions (Wt. %) | | | | Synthetic Bauxite Compositions (Wt. %) | | | |
|---|---|---|---|---|---|---|---|---|
| | F357 | F358 | F359 | F360 | F361 | F362 | F363 | F364 |
| Low Soda Calcined Alumina (99% + $Al_2O_3$) | 65.5 | 63.0 | 69.5 | 67.0 | 64.7 | 62.2 | 68.65 | 66.18 |
| Baddeleyite Ore (98% $ZrO_2$) | 32 | 32 | 28 | 28 | 32 | 32 | 32 | 28 |
| Rutile (95% $TiO_2$) | 2.5 | 5.0 | 2.5 | 5.0 | 2.5 | 5.0 | 2.5 | 5.0 |
| Silica (98% $SiO_2$) | — | — | — | — | 0.6 | 0.58 | 0.64 | 0.62 |
| Ferric Oxide (87% $Fe_2O_3$) | — | — | — | — | 0.2 | 0.19 | 0.21 | 0.20 |
| | 100.0 | 100.0 | 100.0 | 100.0 | 100.0 | 99.97 | 100.0 | 100.0 |
| Fine Graphite | 1.0 | 1.2 | 1.0 | 1.2 | 1.0 | 1.2 | 1.0 | 1.2 |

NOTE: The graphite additions appear excessive but this is not the case since a large proportion is oxidized in the crust and does not enter the melt. The figures used are those found to give satisfactory results and were empiracally determined on a trial and error basis. A much coarser source of carbon would appreciably reduce the quantities required.

The mix compositions in Table No. 5 after fusion, casting into a 1" rod mold as previously described, and when solidified and crushed in the manner previously

EXAMPLE 3

Accurately matched grit splits in 36 grit of the compositions specified in Example 2 and produced by the methods described previously were incorporated into coated abrasive belts. A sample of conventional brown fused alumina produced by the fusion and refining of bauxite as manufactured by The Carborundum Co., Ltd., Manchester, England, and in the quality designed G52E which is widely used in such coated abrasive belts was also made into belts. The grit size of the G52E was accurately cross matched to the experimental compositions F357 to F364.

In order to eliminate variables regarding levels of dust on the different grains and possible variations in their electrostatic projections properties all grains were washed to remove the dust followed by a surface treatment to guarantee standard surface electrical conductivities.

The treated grains were then electrostatically projected onto flexible backing material across a projection gap of about 25 mm using a 19 KV DC projection voltage over a time period of about 20 seconds.

The flexible backing material was a 4/1 sateen weave polyester cloth approximately 103×40 threads per square inch, which had previously been coated with a maker adhesive mix consisting of a commercial one stage liquid phenolic resin with a phenol to formaldehyde ratio of approximately 1:1.6 designated S363 as manufactured by The Carborundum Co. Ltd., Manchester. The resin also contained ground limestone of an average particle size of approximately 17-25 microns. The proportion of resin to ground limestone was 58% resin by weight and 42% limestone by weight. Additionally the maker abrasive also contained a wetting agent MANOXOL O.T. at a level of 0.1% by weight. The maker adhesive had a viscosity of approximately 8 poise at the coating temperature. A typical maker weight of 0.28 Kg/m² was used for 36 grit.

The cloth with the adhering abrasive grit at a concentration of approximately 0.9 Kg/m² was then carefully dried for 1 hour minimum at 75° C., plus 3 hours minimum at 90° C.

A sizer coat is then applied to the grain surface to partially fill in the gap between the projected abrasive grits to improve their adhesion and bond strengths. The sizer weight used is approximately 0.65 Kg/m₂. The composition of the sizer is basically the same as the maker adhesive but has 1 ½% addition by weight of PYROGENE. This prevents the sizer coat from "running" during the final drying and curing.

A typical cure after sizing is a minimum of 1 hour at 75° C., a minimum of 3 hours at 90° C., a minimum of 1 hour at 96° C. a minimum of 1 hour at 100° C. and a minimum of 12 to 14 hours at 107° C.

After curing the product is placed in a humid atmosphere of 95%+ relative humidity for 24 hours minimum. After which time the product is flexed in three directions at 45° C. to facilitate easy handling during the manufacture in the form of belts. Abrasive belts 82"×2" wide are made from the coated abrasive material by the usual techniques.

A series of belts incorporating the experimental abrasives F357-F364 as listed in Table No. 6 and G52E conventional fused alumina were prepared in this manner.

The belts produced were then evaluated on a conventional heavy duty floor backstand belt tester using mild steel workpieces in the form of rolled ¾"×¾"×⅛" angle cross section by about 48" long. In the test the belt is placed on the backstand in the normal manner and the workpiece so positioned so that the ¾"×¾"×⅛" section engages the belt just below the horizontal diameter of the contact wheel.

The abrasive belt is driven at 4,500 surface feet per minute over a contact wheel of 14 inches in diameter. 16 lbs dead weight infeed force is applied to the workpiece and 50 contacts of 2.25 seconds duration with a 10 second interval between each of the 50 contacts comprising a grinding cycle. The amount of metal removed (i.e. ground) in each grinding cycle is measured and testing is continued until the metal removed in a cycle falls to below 66 gms. The total weight of material removed by the belt and the total weight lost by the belt thus define the relative performance ability of each belt when tested in this manner.

The abrasive belts gave the following results listed in Table No. 7.

TABLE NO. 7

| Abrasive | 1st Test Series | | 2nd Test Series | |
|---|---|---|---|---|
| | Metal Removed (gms) | Belt Loss (gms) | Metal Removed (gms) | Belt Loss (gms) |
| F357 | 1888 | 12 | 1292 | 9.0 |
| F358 | 1265 | 10 | 1189 | 10.0 |
| F359 | 1470 | 11 | 1279 | 10.0 |
| F360 | 1848 | 13 | Not Tested | |
| F361 | 1408 | 12 | 1154 | 10.0 |
| F362 | 1768 | 19 | 1361 | 11.5 |
| F363 | 1426 | 12 | 1119 | 11.0 |
| F364 | Not Tested | | 1267 | 12.0 |
| G52E (conventional) Al₂O₃ | 571 | 9 | 415 | 8 |

The large performance advantage of the abrasives of the current invention over conventional fused alumina is clearly apparent. Improvements of 100 to 230% are being obtained. The difference between the two series was due to the different contact times used. Each grinding cycle of the first test series was 50 contacts of 2.25 seconds whereas each grinding cycle of the second series was 50 contacts of 2 seconds duration.

EXAMPLE 4

The test data produced for belts is obtained in what the "industry" refers to as a low cut frequency operation, i.e., the number of times each cutting point makes contact with the workpiece per second is comparatively low. Cut frequency for belts depending on the land groove ratio of contact wheels used is typically 1 to 10 per second. In order to assess the merits of the novel abrasive compositions in high cut frequency coated abrasive applications tests were also carried out in which the abrasives were incorporated into 7" diameter coated abrasive discs. Here the cut frequency per grit can be as high as 100 per second.

Essentially the same procedures were carried out as detailed in Example 3, except that the abrasive grits were projected onto a heavy duty fiber backing material.

The maker coat for discs was a commercial one stage liquid phenolic resin with phenol to formaldehyde ratio of 1:1.55, designated CL32 as manufactured by The Carborundum Co. Ltd. at Manchester. A 15% by weight of "Ethane Diol" is added to the CL32 and also crushed limestone in the ratio of 9 parts by weight Calcium Carbonate powder to 11 parts by weight of CL32. Wetting agent MANOXOL "OT" and water are added to give a coating viscosity of 17 poise. The maker weight used is 0.53 Kg/m². The grain weight projected electrostatically onto the maker coat is 1.4 Kg/m². (Depending on the specific gravity the grain weight is modified to a constant volume basis).

The projection voltage of 19 KV DC across a 25 mm gap and time of 20 seconds are used.

The coated products at this stage is dried for a minimum of 3 hours at 90° C.

A sizer coat is then applied which comprises 35 parts by weight of a one stage commercial liquid phenolic resin with a phenol to formaldehyde ratio of 1 to 1.6, designated CL151 and manufactured by The Carborundum Co. Ltd., Manchester; 65 parts by weight of cryolite filler; and in addition 2 ½ parts by weight of Denox (iron oxide pigment grade) and 0.1 parts MANOXOL "OT" wetting agent. The sizer weight used is about 0.69 Kg/m².

The product is dried and cured for a minimum of 4 hours at 90° C. plus 14–16 hours at 107° C. followed by humidification at 95%+ relative humidity for 24 hours and ball flexed in the standard manner used in the industry. 7" diameter discs were stamped out of the coated abrasive product in the normal manner.

Accurately cross matched grit splits in 36 grit of the abrasive compositions listed in Table No. 5 and also conventional fused alumina designated G52E as indicated in Example 3, were incorporated into 7" diameter coated abrasive discs in the manner described.

The discs produced were mounted on an aluminum alloy back up pad which was faced with 1/16-⅛" thick insertion rubber. The disc was so arranged as to contact the end of a 8" diameter mild steel tube having a ¼" wall thickness and initial length of 10 inches. The workpiece is angled vertically about 2°-3° from horizontal and in the horizontal plane about 1° to 2° from normal. The workpiece rotates at 70 surface feet per minute and the disc at a peripheral velocity of 10,000 surface feet per minute. The disc is applied to the workpiece under a dead weight force of 50 pounds.

The disc grinds the workpiece for a contact period of 15 seconds after which time the workpiece is removed, weighed, watercooled and dried. Repeated contacts to this pattern are carried out until the quantity of metal removed in a 15 second contact falls below 20 gms. at which time the total metal removed and total disc loss are taken as the measure of the abrasive's performance. Tests carried out in this manner on the F357-364 series and standard alumina G52E gave the following results listed in Table No. 8.

TABLE NO. 8

| Abrasive | | Metal Removed (gms) | Disc Loss (gms) |
|---|---|---|---|
| F357 | ⎫ | 1004 | 2.73 |
| F358 | ⎬ Low Soda Alumina | 918 | 2.88 |
| F359 | | 1071 | 2.80 |
| F360 | ⎭ | 1171 | 4.05 |
| F361 | ⎫ | 637 | 1.93 |
| F362 | ⎬ Synthetic Bauxite | 735 | 2.68 |
| F363 | | 660 | 2.17 |
| F364 | ⎭ | 810 | 2.60 |
| G52E (Standard Fused $Al_2O_3$) | | 537 | 2.20 |

The abrasives of the current invention are again shown to be superior to conventional standard fused alumina G52E. Improvements up to 118% are obtained.

EXAMPLE 5

To compare the performance of abrasives of the current invention in bonded products two further synthetic bauxite composition fusions were carried out as described previously using the following mix compositions given in Table 9.

TABLE NO. 9

| | Fusion Numbers | |
|---|---|---|
| Mix Composition | F365 | F366 |
| Alumina $Al_2O_3$ | 66.7% Wt. | 64.2% Wt. |
| Rutile | 2.5 | 5.0 |
| Silica | 0.6 | 0.6 |
| Ferric Oxide | 0.2 | 0.2 |
| Baddelyite | 30.0 | 30.0 |
| | 100.0 | 100.0 |
| Fine Graphite | 1.0% | 1.2% |

The analyses of the finished abrasive grits are listed in Table 10.

TABLE NO. 10

| | F365 | F366 |
|---|---|---|
| $Al_2O_3$ | 68.72 Wt. % | 65.25 Wt. % |
| $ZrO_2$ | 28.60 | 30.20 |
| $TiO_2$ | 1.76 | 3.24 |
| CaO | 0.04 | 0.02 |
| $Fe_2O_3$ | 0.14 | 0.24 |
| $SiO_2$ | 0.76 | 1.08 |
| $Na_2O$ | 0.10 | 0.10 |
| Gain on Ignition (100s and finer 1300° C. for 2 hours) | 0.29% | 0.35% |
| Specific Gravity | 4.42 gm/cc | 4.47 gm/cc |

The abrasive grits produced were accurately cross matched for shape and size distribution to a conventional fused brown alumina abrasive obtained by the fusion of bauxite which is widely used in bonded abrasive products and which is designated EDR.

Wheel Formulations
Grit splits used in the test wheels were:
64.0%   −24 + 28 Mesh
36.0%   −28 + 32 Mesh The bonded abrasive mix formulations used were:

| | EDR | F365 | F366 |
|---|---|---|---|
| Abrasive | 76.02 Wt. % | 78.02 Wt. % | 78.20 Wt. % |
| Bonded Blend | 17.10 | 15.68 | 15.54 |
| CS 303 | 1.71 | 1.57 | 1.55 |
| CL50 | 5.17 | 4.74 | 4.70 |

NOTE: The different weight percentages are the adjustments made to allow for the difference specific gravities of F365 and F366 compared to that of EDR (which is 3.95 gms/cc). These ensure that the volume of abrasive to bonding phase is kept constant.

The bond blend consists of a fine powdered mixture of CS222 resin at 36.9 wt. percent and 63.1% of a combination of whiting and potassium aluminum fluoride fillers.

The CL50 is a one stage liquid phenolic resole having a phenol formaldehyde ratio of 1:1.2. The CS303 is a powdered phenolic novolac having a phenol formaldehyde ratio of 1:0.71.

The mix procedure is to wet up the grain using the CL50 and then to add to the bond blend 22 to build up the bond coating on the wetted grain. Add the CS303 as a dusting powder to complete the mix and give a free flowing mix ready for molding.

Wheels

The above mixes were used to make type 27 depressed center wheels of 7" diameter and ¼" thickness containing one internal reinforcing woven glass fabric located at the center and one external back face reinforcing woven glass fabric. The wheels were molded in the conventional manner to give pressed wheel densities of:

| | EDR | F365 | F366 |
|---|---|---|---|
| Hard Grade | 39.5 gm/in$^3$ | 43.07 gm/in$^3$ | 43.45 gm/in$^3$ |
| Soft Grade | 38.0 | 41.57 | 41.95 |

The variations in molding density again are to allow for basic differences in abrasive specific gravities, i.e. volume of abrasive to bond in the pressed wheels are identical for a specific grade.

The wheels are clamped together in stacks using metal spacers shaped to the geometry of the wheels and are cured in this state. The cure cycle is approximately 27 hours up to 355° F. and a soak at 355° F. for 10 hours. The cured wheels are edged accurately to 7" diameter and checked for cured density prior to testing.

The type 27 depressed center wheels of 7" diameter were tested on a machine designed specifically for evaluating this type of product.

The wheel is mounted in the machine which rotates the wheel at 6,000 r.p.m. The mild steel workpiece in the form of 8"×4"×¼" thick plate is clamped beneath the wheel such that the wheel traverses backwards and forwards along the ¼"×8" edge. The test wheel under a dead weight force of 13 lbs. is presented to the workpiece at an angle typical of that used in "off-hand" grinding. There is a "rocking motion" imparted to the test piece which stimulates the tilting movement used by an operator using a portable grinder. This "rocking motion" traverses the workpiece under the wheel at a rate of about 30 feet per minute.

The test involves measuring the metal removed and wheel loss incurred during 2 minutes contacts of wheel and metal. The test is continued until the metal removal obtained falls below 30 gms for a 2 minute contact. The data generated express the relative performance of the abrasives tested in terms of average metal removal rate grinding ratio and quality factor. The grinding ratio is the total metal removed divided by the equivalent weight loss of the wheel. To allow for differences in wheel density due to abrasive specific gravity differences all wheel losses are standardized to the volume equivalent of standard fused alumina wheels (i.e. equivalent weight loss).

The results obtained for F365 and F366. and standard EDR fused alumina are given in Table No. 11.

TABLE NO. 11

| Abrasive | Wheel Grade | Average Metal Removal Rate (gm/min) | G.R. | Q.F. (MRR × GR) |
| --- | --- | --- | --- | --- |
| EDR (Standard | Soft | 24.97 | 13.64 | 341 |
| Fused Alumina) | Hard | 24.66 | 13.05 | 322 |
| F365 | Soft | 27.87 | 16.74 | 467 |
|  | Hard | 27.64 | 20.64 | 571 |
| F366 | Soft | 27.65 | 20.07 | 555 |
|  | Hard | 27.38 | 27.10 | 742 |

The data clearly shows the superior performance of the current abrasives over standard fused alumina in a bonded abrasive product. It also clearly indicates the improvement made by increasing the titania content from 1.76% in F365 to 3.24 in F366. Performance as indicated by QF have been obtained with F366 which are up to 130% superior to standard fused alumina.

The above Examples have clearly demonstrated the superior low to intermediate pressure performance of abrasives of the current invention when incorporated into coated and bonded abrasive products and when compared to similar products containing conventional fused aluminas under a variety of conditions. The abrasives of the current invention gave up to 230% improvements in coated products and in excess of 100% in bonded products.

In order to give an indication of the performance of alumina zirconia eutectic abrasives containing 40-43% by weight zirconia and produced according to U.S. Pat. No. 3,891,408 to Rowse et al., performance of a commercially available alumina zirconia eutectic abrasive was compared with conventional fused alumina.

EXAMPLE 6

When the commercially available eutectic abrasive was cross matched for grit size and shape and incorporated into coated abrasive belts as produced in Example 3 and tested as in that Example 5 gave the results listed in Table No. 12.

TABLE NO. 12

| Abrasive | 1st Test Series | | 2nd Test Series | |
| --- | --- | --- | --- | --- |
|  | Metal Removal (gms) | Belt Loss (gms) | Metal Removal (gms) | Belt Loss (gms) |
| Commercial Eutectic (40-43% ZrO$_2$) | 1699 | 8 | 1236 | 10 |
| Standard G52E Conventional Fused Alumina | 571 | 9 | 415 | 8 |

TABLE NO. 12-continued

| Abrasive | 1st Test Series | | 2nd Test Series | |
| --- | --- | --- | --- | --- |
|  | Metal Removal (gms) | Belt Loss (gms) | Metal Removal (gms) | Belt Loss (gms) |
| Alumina | | | | |

The performance of the eutectic abrasive was about 200% superior to conventional fused alumina.
NOTE:
1st test series used 50 contacts of 2.25 seconds/cycle;
2nd test series used 50 contacts of 2.0 seconds/cycle.

EXAMPLE 7

When the commercially available alumina zirconia eutective abrasive was crossed matched for grit size and shape and incorporated into coated abrasive discs as produced in Example 3 and when tested as described in that Example 7 the results listed in Table No. 13 were obtained.

TABLE NO. 13

| Abrasive | Metal Removed (gms) | Disc Loss (gms) |
| --- | --- | --- |
| Commercial Alumina Zirconia Eutectic | 984 | 2.75 |
| G52E Standard Fused Alumina | 537 | 2.20 |

The commercial eutective abrasive gave an 83% improvement when compared with standard fused alumina.

EXAMPLE 8

When the commercial alumina zirconia eutective abrasive was cross matched for grit size and shape and incorporated in type 27 depressed center wheels as produced in Example 5 and when tested as described in that Example the results listed in Table 14 were obtained. (The specific gravity of the eutectic abrasive was accounted for in terms of mix formulations and pressed wheel densities).

TABLE NO. 14

| Abrasive | Wheel Grade | Average Metal Removal Rate (gm/min) | G.R. | Q.F. |
| --- | --- | --- | --- | --- |
| Commercial Alumina Zirconia Eutectic | Soft | 28.15 | 21.14 | 595 |
|  | Hard | 23.70 | 32.19 | 763 |
| Std. Fused Alumina EDR | Soft | 24.97 | 13.64 | 341 |
|  | Hard | 24.66 | 13.05 | 322 |

The eutectic abrasive's performance is 74 to 137% superior to standard fused alumina.

The performance advantage over standard fused alumina of the commercially available alumina zirconia abrasive, embodying the major claims and teachings of U.S. Pat. No. 3,891,408 are similar, equal or in certain instances inferior to those of the current invention was that it is produced outside the compositional limits and structural features claimed to optimize low to moderate pressure performance of the alumina zirconia system as cited in U.S. Pat. No. 3,891,408. The ability to achieve equivalent or superior performance is made possible by the presence of the titania or reduced form thereof. The ability to reduce the zirconia content and still maintain excellent performance can reduce raw material costs significantly.

Additional grinding performance data for grain made according to the invention is of record in a Declaration filed Aug. 8, 1988, in application Ser. No. 917,235.

EXAMPLE 9

This example illustrates preferred furnacing conditions. In making successive mixes, a portion of the melt remains in the furnace at the time of the pour and solidifies. This solidified material is left in the furnace and is remelted along with the new charge. The alumina and zirconia are preferably melted under oxidizing conditions, particularly when the same furnace is used for successive batches of the abrasive composition of the invention, in order to more quickly melt the entire furnace charge, including the solidified material from the previous charge. The solidified material from the previous charge is especially rich in titanium compounds (such as TiC and possibly titanium oxycarbides), which are present in the mix are denser than the melt., and tend to settle to the bottom of the furnace.

After the alumina and zirconia are melted, the furnace is preferably switched to reducing conditions, when the $TiO_2$ is added. For example, in making successive 750 pound mixes, the furnace containing solidified material from the previous pour is charged with 670 pounds of alumina and zirconia in the desired proportions (452.5 pounds alumina and 217.5 pounds zirconia, to make a preferred composition which will when poured contain about 31% zirconia and about 4.5%. expressed as titanium dioxide, of reduced titania).

Using a three-phase carbon electrode power source, the power is set at 125 volts and 650 kilowatts, and the electrodes are maintained above the alumina-zirconia mix. This is an oxidizing condition. The power is supplied for a time sufficient to melt the mix, about 55-60 minutes.

An additional 50 pounds of alumina and zirconia in the same proportion as the 670 pounds previously added, mixed with 31.5 pounds $TiO_2$ and 17.5 pounds carbon coke, is spread over the top of the melt. The voltage is then dropped to 75 volts, the electrodes are immersed to a depth of 3-6 inches into the alumina-zirconia mix, and the power increases to 750 kilowatts. This is a reducing condition. This power is maintained until the additional material is melted, about 20-25 minutes.

Finally, an additional 30 pounds of alumina-zirconia mix, without $TiO_2$ or carbon, is added to the top of the melt, about an inch thick. Power is supplied for an additional 5-10 minutes to melt the additional material, so the entire furnacing time is about 80-95 minutes. This last addition is added to insure that the $TiO_2$ and carbon enter the melt, instead of staying on top of the melt as a solidified crust rich in titanium compounds. When the mix is melted the third time, the power is shut down, the electrodes are removed, and the melt is poured.

The final preferred composition so made is found to contain about 31% zirconia and about 4.5%, expressed as titanium dioxide, of reduced titania. The titanium compounds actually present are believed to be $TiO_2$, TiC, $Ti_2O_3$, possibly titanium oxycarbides, and the like. The composition contains about 0.3% soluble titanium (present as TiC). and about 0.25% carbon.

All percentages herein are expressed as weight percents, unless otherwise noted.

I claim:

1. An abrasive grit comprising from about 20 to about 50% by weight of zirconia of which more than 25% by weight of the zirconia present is in tetragonal crystal form; from 1.5 to about 10%, expressed as titanium dioxide, of reduced titania; from 0.03 to about 0.5% total carbon; impurities, if any, in an amount on analysis expressed as the oxides of not more than 3% by weight, including less than 1% $SiO_2$; and a balance of alumina, said abrasive grain being a fused grit.

2. An abrasive grit comprising from about 27 to about 35% by weight of zirconia of which more than 25% by weight of the zirconia present is in the tetragonal crystal form; from 1.5 to about 10%, expressed as titanium dioxide, of reduced titania; from 0.03 to about 0.5% total carbon; impurities, if any, in an amount on analysis expressed as the oxides of not more than 3% by weight, including less than 1% $SiO_2$; and a balance of alumina.

3. An abrasive grit according to claim 2, containing from about 2.4 to about 5%, expressed as titanium dioxide, of reduced titania.

4. An abrasive grit comprising about 31% zirconia, about 4.5%, expressed as titanium dioxide, of reduced titania; from 0.03 to about 0.5% total carbon; impurities, if any, in an amount on analysis expressed as the oxides of not more than 3% by weight, including less than 0.5% $SiO_2$; and a balance of alumina.

5. An abrasive grit according to claim 2, containing from about 0.08 to about 0.25% total carbon.

6. An abrasive grit according to claim 3, containing from about 0.08 to about 0.25% total carbon.

7. An abrasive grit according to any one of claims 1 to 3, comprising less than 0.5% by weight $SiO_2$.

8. A fused abrasive grit material comprising from about 20 to about 50%, by weight of said abrasive grit material, of zirconia, of which at least 25% by weight of said zirconia is in the tetragonal crystal form; from 0.9 to 6.0%, by weight of said abrasive grit material, of titanium, at least some of which is dissolved in said abrasive grit material, said dissolved titanium existing in a form having compounded therewith less oxygen than titania, with the balance of said titanium, undissolved, existing in at least one compound form having less oxygen than titania; from about 0.03 to about 0.5%, by weight said abrasive grit material, of total carbon; and impurities of not more than about 3.0% by weight of said abrasive grit material; the balance of said abrasive grit material being essentially alumina; wherein said abrasive grit material comprises an alumina-zirconia eutectic microstructural phase.

9. The invention of claim 8 wherein said alumina-zirconia eutectic microstructural phase is a matrix having embedded therein primary alumina crystals with said matrix containing essentially no primary zirconia crystals.

10. The invention of claim 8 wherein said alumina-zirconia eutectic microstructural phase is a matrix having embedded therein primary zirconia crystals with said matrix containing essentially no primary alumina crystals.

11. The invention of claim 9 wherein at least a portion of said dissolved titanium is dissolved in said primary alumina crystals.

12. The invention of claim 10 wherein said dissolved titanium is essentially dissolved in said alumina-zirconia eutectic microstructural phase.

13. The invention of claim 9 wherein said primary alumina crystals vary in size from about 5 microns to about 50 microns.

14. The invention of claim 10 wherein said primary zirconia crystals vary in size from about 5 microns to about 50 microns.

15. The invention of claim 13 wherein said primary alumina crystals exhibit a dendritic type of oriented structure separated at least in part by said alumina-zirconia eutectic microstructural phase.

16. The invention of claim 14 wherein said primary zirconia crystals exhibit a dendritic type of oriented structure separated at least in part by said alumina-zirconia eutectic microstructural phase.

17. The invention of claim 15 wherein the portions of said alumina-zirconia eutectic microstructural phase, which separates said dendritic type of oriented structure of said alumina crystals, comprises rods of zirconia having a high degree of orientation.

18. The invention of claim 16 wherein the portions of said alumina-zirconia eutectic microstructural phase, which separates said dendritic type of oriented structure of said zirconia crystals, comprises rods of zirconia having a high degree of orientation.

19. The invention of claim 8 wherein said material contains from about 27% to about 35%, by weight of said material, of said zirconia.

20. The invention of claim 9 wherein said material contains from about 27% to about 35%, by weight of said material, of said zirconia.

21. The invention of claim 8 wherein said material contains from about 1.44% to about 3.0%, by weight of said material, of said titanium.

22. The invention of claim 9 wherein said material contains from about 1.44% to about 3.0%, by weight of said material, of said titanium.

23. The invention of claim 10 wherein said material contains from about 1.44% to about 3.0%, by weight of said material, of said titanium.

24. The invention of claim 8 wherein said material contains from about 0.08% to about 0.25%, by weight of said material, of said total carbon.

25. The invention of claim 9 wherein said material contains from about 0.08% to about 0.25%, by weight of said material, of said total carbon.

26. The invention of claim 10 wherein said material contains from about 0.08% to about 0.25%, by weight of said material, of said total carbon.

27. The invention of claim 8 wherein said alumina-zirconia eutectic microstructural phase comprises zirconia rots having a diameter in the range of greater than 0.2 microns to about 0.4 microns.

28. The invention of claim 8 wherein said alumina-zirconia eutectic microstructural phase comprises zirconia platelets having a thickness in the range of greater than 0.2 microns to about 0.4 microns.

29. The invention of claim 8 wherein said abrasive grit material is in a size range of 120 grit or larger.

30. The invention of claim 8 wherein said impurities contain not more than 0.1%, by weight of said abrasive grit material, of soda, not more than 1.0%, by weight of said abrasive grit material, of silica and not more than 1.5%, by weight of said abrasive grit material, of a combination of magnesia, lime and iron oxide.

31. A process of producing an abrasive grit material according to claim 8, comprising the steps of:
 a) combining
  1) from about 40 to about 78.5 parts by weight of alumina, with
  2) from about 20 to about 50 parts by weight of zirconia;
 b) melting said combined alumina and zirconia;
 c) after melting said combined alumina and zirconia, adding, to said melted alumina and zirconia,
  3) from 1.5 to about 10 parts by weight of titania; and
  4) from about 0.6 to about 5 parts by weight of carbon;
 d) after adding said titania and said carbon, heating the combined ingredients under reducing furnace conditions until said titania is melted and reduced by said carbon; and then
 e) casting the melted composition onto a heat sink material in such a manner that solidification of the melt is effected in under three minutes.

32. A process according to claim 31, wherein the composition combined contains from about 27 to about 35% zirconia.

33. A process according to claim 31, where the composition cast contains from about 2.4 to about 5% titania.

34. A process according to claim 33, wherein solidification of the melt is effected under one minute.

35. A process according to claim 33, wherein solidification of the melt is effected under twenty seconds.

36. A coated abrasive product comprising an abrasive grain as claimed in one of claims 8-12.

37. A bonded abrasive product comprising an abrasive grain as claimed in one of claims 8-12.

* * * * *